Patented Aug. 6, 1935

2,010,443

UNITED STATES PATENT OFFICE 2,010,443

DISINFECTING AND INSECTICIDAL AGENT

Robert L. Sibley, Nitro, W. Va., assignor to The Rubber Service Laboratories Company, Akron, Ohio, a corporation of Ohio No Drawing. Application May 6, 1933, Serial No. 669,797

11 Claims. (Cl. 167—31)

The present invention relates to improvements in disinfecting and insecticidal agents and the like. The objects of this invention are to provide a new class of disinfecting and insecticidal agents which are more efficient in their action than disinfecting and insecticidal agents heretofore made by reason of the fact that the new materials according to the present invention have greater spreading, dispersing and wetting properties.

It is well known that the efficiency of an insecticide, disinfectant and the like which is contacted with the object to be protected, by any convenient means, as for example, by spraying thereon, depends to a large extent upon the surface covered by the liquid, or in other words upon the wetting power thereof.

Heretofore, it has been customary to incorporate with the insecticide or disinfectant one or more soaps, as for example potassium oleate, and thus to a certain extent increase the wetting or spreading effect of the insecticide, disinfectant and the like.

According to the present invention a new class of materials has been found, which may be employed alone, as for example in the form of an aqueous solution or emulsion thereof as an insecticide or disinfectant, but preferably are employed in conjunction with other insecticides, disinfectants and the like, thereby markedly increasing their effectiveness. The new class of materials which have been found to possess these desirable properties comprise the soluble salts of the sulfuric acid derivatives of the reaction products of a hydroxy di-aryl and an alcohol.

As examples of the new and preferred class of materials and falling within the scope of the present invention are the soluble salts, as for example, the sodium salts of the sulfuric acid derivatives of the following reaction products: reaction produuct of normal butyl alcohol and a mixture of substantially 85% ortho hydroxy diphenyl and substantially 15% para hydroxy diphenyl; reaction product of normal butyl alcohol and a mixture of substantially 95% ortho hydroxy diphenyl and substantially 5% para hydroxy diphenyl; reaction product of iso propyl alcohol and a mixture of substantially 95% ortho hydroxy diphenyl and substantially 5% para hydroxy diphenyl; reaction product of normal butly alcohol and para hydroxy diphenyl; reaction product of normal butyl alcohol and ortho hydroxy diphenyl; reaction product of iso-butyl alcohol and a mixture of substantially 95% ortho hydroxy diphenyl and substantially 5% para hydroxy diphenyl; reaction product of normal amyl alcohol and a mixture of substantially 95% ortho hydroxy diphenyl and substantially 5% para hydroxy diphenyl; reaction product of cyclohexanol and a mixture of substantially 95% ortho hydroxy diphenyl and substantially 5% para hydroxy diphenyl; reaction product of octyl alcohol and a mixture of substantially 85% ortho hydroxy diphenyl and substantially 15% para hydroxy diphenyl; reaction products of alpha dinaphthol and beta dinaphthol with normal butyl alcohol, iso-propyl alcohol, iso-butyl alcohol, normal amyl alcohol, iso-amyl alcohol, cyclohexanol, octyl alcohol, cetyl alcohol and benzyl alcohol respectively; reaction products of alpha naphthyl phenol and beta naphthyl phenol with normal butyl alcohol, iso-butyl alcohol, normal propyl alcohol, iso-propyl alcohol, normal amyl alcohol, iso-amyl alcohol, cyclohexanol, octyl alcohol, cetyl alcohol and benzyl alcohol respectively.

The examples hereinbefore set forth are conveniently prepared according to the process disclosed in my co-pending application Serial No. 639,149, filed October 22, 1932.

The examples hereinbefore set forth may be employed alone as an insecticide or disinfectant in the form of an aqueous solution or as a solution or suspension thereof in a petroleum hydrocarbon, as for example kerosene and the like. Preferably, however, the preferred class of materials are employed in conjunction with one or more additional insecticides, disinfectants and the like.

The following examples are to be understood as specific embodiments of the invention and not as limitations thereof.

*Example I*

A solution may be made up comprising 2 parts of a 40% solution of free nicotine diluted with about 500 parts of water. To the solution so obtained substantially 0.5 to 5 parts of one of the preferred class of materials, for example, the sodium salt of the sulfuric acid derivative of the reaction product of substantially two molecular proportions of butyl alcohol and substantially one molecular proportion of a mixture of substantially 95% ortho hydroxy diphenyl and substantially 5% para hydroxy diphenyl, may be conveniently added thereto. The material so produced may be employed as an insecticide, as for example, by spraying on the surface of the infected plant.

*Example II*

To the usual Bordeaux mixture, substantially 0.1% to 1.0% of the weight thereof of the sodium salt of the sulfuric acid derivative of the reaction product of normal butyl alcohol and ortho hydroxy diphenyl may be added, and the resulting product employed as a spray for plants, seeds and the like.

Example III

A lime-sulfur wash was made up comprising

| | |
|---|---|
| Sulfur (flowers) | 4 pounds |
| Lime | 4 pounds |
| Water | 25 gallons |

To the lime-sulfur wash prepared as described, a quantity of the potassium salt of the sulfuric acid derivative of the reaction product of beta dinaphthol and normal amyl alcohol may be added equal to substantially 0.1% to 1.0% of the weight of said wash, and the resulting product employed as a fungicide.

Example IV 1 part of mercuric chloride may be dissolved in 1,000 parts of water and substantially 1 to 10 parts of the calcium salt of the sulfuric acid derivative of the reaction product of octyl alcohol and para hydroxy diphenyl added thereto and the resulting product employed as an insecticide against pear blight.

The preferred class of materials may also be employed as a moth proofing ingredient. It has been found that solutions of fluorides combined with other chemicals having moth proofing properties do not easily penetrate into woolen fabrics and when applied in pure form are apt to roll off or evaporate without impregnating the fabric. According to the present invention the preferred class of materials may be employed in conjunction with aqueous solutions of soluble fluorides or soluble silico fluorides or mixtures thereof with improvement in the wetting and penetrating properties of the resulting composition and a consequent improvement in the moth proofing properties thereof. Thus, as a specific example, the sodium salt of the sulfuric acid derivative of the reaction product of substantially two molecular proportions of butyl alcohol and substantially one molecular proportion of a mixture of substantially 95% ortho hydroxy diphenyl and substantially 5% para hydroxy diphenyl may be employed in conjunction with soluble silico fluorides with a resulting improvement in the moth proofing qualities thereof.

By the term "hydroxy substituted diaryl", as appearing in the present specification, is meant a compound composed of two aromatic nuclei joined together through a carbon atom of each by means of a single bond, said compound containing one or more hydroxy substituents.

The use of the preferred class of materials is not limited to the examples hereinbefore set forth as they are to be understood as illustrative only. Other methods of employing the class of materials hereinbefore set forth are readily apparent to those skilled in the art to which this invention pertains.

The present invention is limited solely by the following claims.

What is claimed is:

1. An insecticide comprising an alkali metal or alkaline earth metal salt of a sulfuric acid derivative of the reaction product of an alcohol containing more than two but less than seventeen carbon atoms and a hydroxy substituted diaryl containing more than eleven but less than twenty-one carbon atoms as a constituent thereof.

2. An insecticide comprising an alkaline metal or alkaline earth metal salt of a sulfuric acid derivative of the reaction product of a monohydric alcohol containing more than two but less than seventeen carbon atoms and a hydroxy substituted diphenyl as a constituent thereof.

3. An insecticide comprising an alkali-metal salt of a sulfuric acid derivative of the reaction product of an aliphatic monohydric alcohol and a hydroxy substituted diphenyl as a constituent thereof.

4. An insecticide comprising an alkali-metal salt of a sulfuric acid derivative of the reaction product of butyl alcohol and a hydroxy substituted diphenyl as a constituent thereof.

5. An insecticide comprising the sodium salt of a sulfuric acid derivative of the reaction product of normal butyl alcohol and an ortho hydroxy substituted diphenyl as a constituent thereof.

6. An insecticide comprising the sodium salt of a sulfuric acid derivative of the reaction product of normal butyl alcohol and a mixture of ortho and para hydroxy diphenyl as a constituent thereof.

7. An insecticide comprising the sodium salt of a sulfuric acid derivative of the reaction product of normal butyl alcohol and a mixture of substantially 95% ortho hydroxy diphenyl and substantially 5% para hydroxy diphenyl as a constituent thereof.

8. An insecticide comprising the sodium salt of a sulfuric acid derivative of the reaction product of normal butyl alcohol and ortho hydroxy diphenyl as a constituent thereof.

9. An insecticide comprising the sodium salt of a sulfuric acid derivative of the reaction product of beta dinaphthol and normal amyl alcohol as a constituent thereof.

10. An insecticide comprising an alkali-metal salt of a sulfuric acid derivative of the reaction product of an aliphatic monohydric alcohol containing more than two but less than seventeen carbon atoms and a hydroxy substituted diphenyl as a constituent thereof.

11. An insecticide comprising an alkali metal or alkaline earth metal salt of a sulfuric acid derivative of the reaction product of a monohydric aliphatic alcohol containing less than seventeen carbon atoms and a hydroxy substituted diaryl containing more than eleven but less than twenty-one carbon atoms as a constituent thereof.

ROBERT L. SIBLEY.

CERTIFICATE OF CORRECTION.

Patent No. 2,010,443. August 6, 1935.

ROBERT L. SIBLEY.

It is hereby certified that error appears in the printed specification of the above numbered patent requiring correction as follows: Page 2, second column, line 6, claim 1, for "an" read a monohydric; and that the said Letters Patent should be read with this correction therein that the same may conform to the record of the case in the Patent Office.

Signed and sealed this 24th day of September, A. D. 1935.

(Seal)

Leslie Frazer
Acting Commissioner of Patents.